O. MEISSNER.
FLOAT CHAMBER FOR CARBURETERS.
APPLICATION FILED JAN. 2, 1914.
1,103,803.
Patented July 14, 1914.
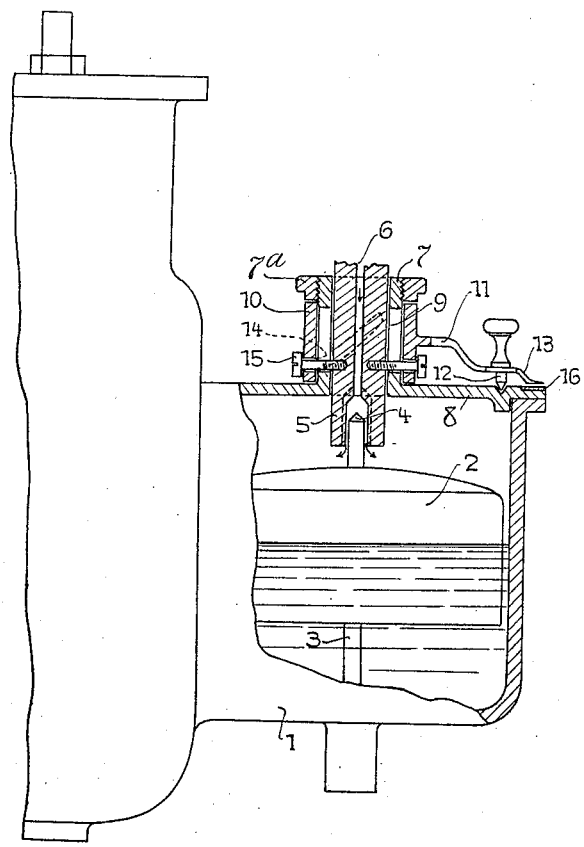

UNITED STATES PATENT OFFICE.

OTTO MEISSNER, OF COSWIG, GERMANY.

FLOAT-CHAMBER FOR CARBURETERS.

1,103,803.  Specification of Letters Patent.  Patented July 14, 1914.

Application filed January 2, 1914. Serial No. 809,998.

*To all whom it may concern:*

Be it known that I, OTTO MEISSNER, a subject of the Duke of Saxon-Meiningen, residing at Coswig, Saxony, Germany, have invented certain Improvements in Float-Chambers for Carbureters, of which the following is a specification.

The present invention relates to a float chamber for carbureters and consists in the provision of means whereby the level at which the liquid surface in the chamber is normally maintained can be varied simply by the adjustment of a pointer arranged outside the chamber and adapted to move over a scale.

The invention is illustrated in the accompanying drawing by a view of the float chamber and part of the carbureting chamber to which it is attached, the float chamber being shown partly in section.

A float 2 is arranged in a chamber 1 in which it is guided by means of a vertical spindle 3. The upper end of the spindle 3 is formed into a valve cone 4 the seat 5 of which is adjustably held in a socket 7 connected to the top cover 8 of the chamber 1. The liquid is fed into the chamber 1 through a duct 6 carried longitudinally through the valve seat body 5. A sleeve 10, having obliquely or spirally disposed slots 14, encircles the socket 7 which carries a nut 7ª adapted to hold the sleeve 10 on the socket and prevent axial displacement. Screws 15, secured to the valve seat body 5, are passed through the slots 14 and through vertical slots 9 made in the socket 7. The effect of the arrangement is that, when the sleeve 10 is turned, the screws 15 will be guided by the slots 14 and 9 and adjusted vertically together with the valve seat 5. The sleeve 10 is turned by means of an arm 11 which is resilient and provided with a stud 12 which secures the sleeve in adjusted position by engagement with a series of depressions made in the cover 8. A pointer 13 is also provided on the arm 11 so as to indicate on a scale 16 the position of the valve seat.

The liquid is, as previously noticed, fed through the duct 6 into the chamber 1. The float 2 is raised by the liquid and closes the duct 6 by means of the valve cone 4 when the liquid attains a certain level. This level, which is thus normally maintained by the float, can be varied by the adjustment of the valve seat 5 by means of the arm 11, and it is dependent upon the nature of the particular fuel used. In the case of benzin, for instance, a lower level will be required than in the case of a heavier fuel such as benzole. It is evident that the adjustment can be effected without disturbing any other elements of the carbureter.

I claim:—

In a carbureter, a float chamber, a float in said chamber, a valve cone carried by said float, a cover for said chamber, a socket formed on said cover, a valve seat held in said socket, so as to coöperate with said cone and so as to allow of vertical adjustment, studs connected to said valve seat and guided in vertical slots in the socket, a rotatable sleeve arranged about said socket and having oblique slots in which said studs are guided so that the valve seat is moved vertically when the sleeve is rotated, an arm connected to the sleeve for facilitating its adjustment, and a pointer on said arm for indicating on a scale the position of the valve seat.

OTTO MEISSNER.

Witnesses:
 PAUL ARRAS,
 OTTO MEDAUR.